United States Patent [19]

Shimaoka et al.

[11] Patent Number: 4,570,195
[45] Date of Patent: Feb. 11, 1986

[54] CARTRIDGE LOADING APPARATUS WITH A CARTRIDGE INSERTION CLICK MEMBER

[75] Inventors: Motohiro Shimaoka; Yukio Saito, both of Furukawa, Japan

[73] Assignee: Alps Electric Co., Ltd., Tokyo, Japan

[21] Appl. No.: 564,755

[22] Filed: Dec. 23, 1983

[30] Foreign Application Priority Data

Dec. 23, 1982 [JP] Japan ............................ 57-193961[U]

[51] Int. Cl.⁴ ............................................ G11B 5/012
[52] U.S. Cl. .......................................... 360/97; 360/93
[58] Field of Search .................. 360/90, 93, 96.1, 96.5, 360/97

[56] References Cited

U.S. PATENT DOCUMENTS 3,904,149  9/1975  Suzuki ................................... 360/96
4,257,075  3/1981  Wysocki et al. ..................... 360/96.5

Primary Examiner—John H. Wolff
Attorney, Agent, or Firm—Guy W. Shoup

[57] ABSTRACT

A recording/reproducing device comprising a cartridge holder adapted to be moved from an unloaded state to a loaded state by a vertical movement of a roller provided on each side portion of the cartridge holder, and a cam hole having a horizontal portion and a vertical portion respectively for holding the roller in upper and lower positions. The cam hole is formed with a projecting portion at its portion changing from the horizontal portion to the vertical portion so that the roller can get over the projecting portion. It is possible to give the "click" touch to the user at the time of transfer from unloaded to loaded state in the disc cartridge inserting operation.

6 Claims, 4 Drawing Figures

CARTRIDGE LOADING APPARATUS WITH A CARTRIDGE INSERTION CLICK MEMBER

BACKGROUND OF THE INVENTION (1) Field of the Invention

The present invention relates to a recording/reproducing device using a disc cartridge.

(2) Description of the Prior Art

Recently, there has been developed a recording/reproducing device including a cartridge holder adapted to assume a loaded state for recording and playback upon insertion therein of a disc cartridge in which is rotatably enclosed a magnetic disc, the cartridge being formed of a hard material. However, this recording/reproducing device is not provided with a mechanism for giving to the user the sense of touch indicating transfer from unloaded to loaded state when the cartridge holder is moved by the insertion therein of the disc cartridge. Therefore, the user feels uneasy about when the cartridge holder assumes the loaded state at the time of insertion therein of the disc cartridge.

SUMMARY OF THE INVENTION

It is the object of the present invention to provide a recording/reproducing device capable of eliminating the above-mentioned drawbacks of the prior art and giving to the user the so-called "click" touch upon transfer to the loaded state when the disc cartridge is inserted into the cartridge holder.

In order to achieve the above-mentioned object, the present invention is characterized by comprising a cartridge holder adapted to be moved from an unloaded state to a loaded state by a vertical movement of a roller provided on each side portion of the cartridge holder, and a cam hole having horizontal and vertical portions for holding the roller is upper and lower positions, respectively, the cam hole being formed with a projecting portion at its portion changing from the horizontal portion to the vertical portion so that the roller can get thereover.

DESCRIPTION OF A PREFERRED EMBODIMENT

Figure 1:
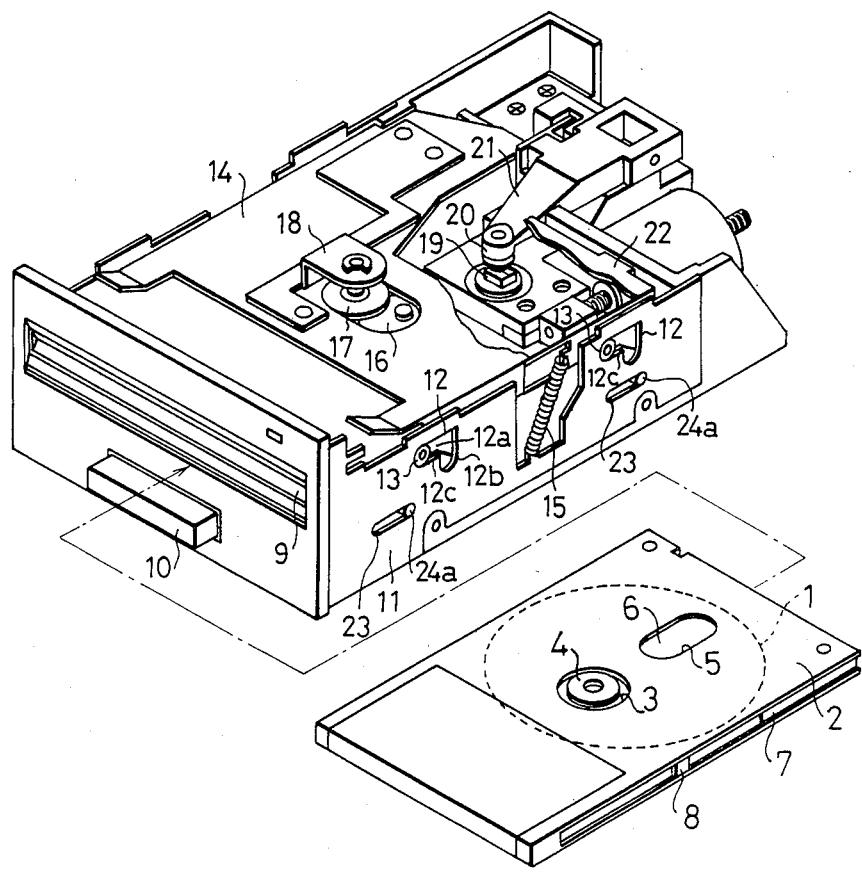
FIG. 1 is a schematic perspective view of a recording/reproducing device according to an embodiment of the present invention.

An embodiment of the present invention will be described hereinunder with reference to the drawings.

A magnetic disc 1 is rotatably enclosed in a disc cartridge 2 formed of a hard synthetic resin, and a hub 4 with centrally holds the magnetic disc 1 is exposed to a through hole 3 formed centrally in the disc cartridge 2. In a predetermined position of the cartridge 2 is formed a magnetic head insertion aperture 5, and below the aperture 5 is pivotably disposed a shutter 6 which comprises a metallic plate. On both sides of the disc cartridge 2 are formed grooves 7, in one of which is slidably disposed a shutter operation portion 8 for operating the shutter 6.

Figure 2:
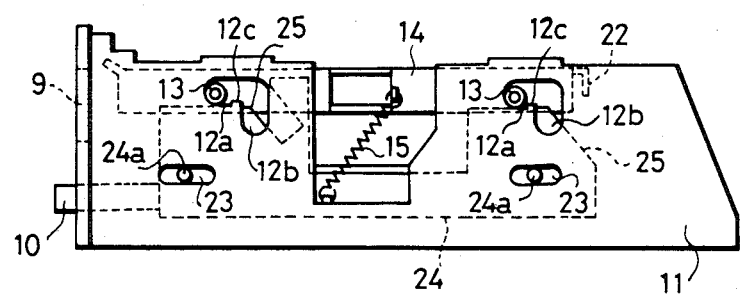
FIG. 2 is a side view showing principal components of the recording/reproducing device in an unloaded state.
Figure 3:
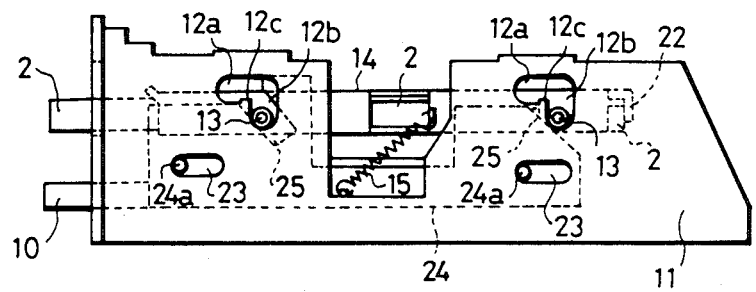
FIG. 3 is a side view showing principal components of the recording/reproducing device in a loaded state.
Figure 4:
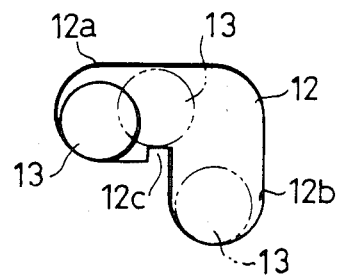
FIG. 4 is a partial side view of a principal portion of the recording/reproducing device in transition from the unloaded state to the loaded state.

On the other hand, in the front frame of the recording/reproducing device are provided an insertion opening 9 for the cartridge holder 14 which is provided at both side portions with rollers 13 adapted to be guided by inverted L-shaped holes formed in both side portions of a frame 11. The cartridge holder 14 is urged downwardly toward the front frame at all times by means of a tension spring 15 attached to the frame 11. While the cartridge 2 is not inserted in the cartridge holder 14, the roller 13 is held in the fore end position of a horizontal portion 12a of the inverted L-shaped hole 12 by the tension spring 15, as shown in FIG. 2. On the front upper portion of the cartridge holder 14, as shown in FIG. 1, there is provided a receiving portion 18 for a pressing portion 17 which presses the hub 14 of the magnetic disc 1 against a turntable 16. Further, on the rear upper surface of the cartridge holder 14 is provided an abutting portion for pushing up an arm 21 with a pad 20 attached thereto when the roller 13 of the cartridge holder 14 is located on the horizontal portion 12a of the inverted L-shaped hole, in opposed relation to the magnetic head 19. Additionally, the cartridge holder 14 is formed at the rear end thereof with a bent portion 22 adapted to abut the fore end of the cartridge 2.

To the eject button 10 is connected a push-up cam member 24 provided at the side portions thereof with pins 24a which are guided by lateral apertures 23 formed in the side portions of the frame 11. The cam member 24 is formed with an inclined push-up portion 25 capable of abutting the roller 13 in a vertical portion 12b of the inverted L-shaped hole 12. Further, the inverted L-shaped hole 12 is formed with a projecting portion 12c at its portion changing from the horizontal portion 12a to the vertical portion 12b, the projecting portion 12c projecting to the extent that the roller 13 can get thereover.

Therefore, when the cartridge 2 is inserted in the cartridge holder 14 and the fore end of the cartridge 2 pushes the bent portion 22 of the cartridge holder 14, the cartridge holder 14 moves to the right in the drawings. When the roller 13 reaches the projecting portion 12c, resistance is once applied to the roller 13, but if the cartridge 2 is further inserted in the cartridge holder, the roller 13 gets over the projecting portion 12c and moves toward the vertical portion 12b of the inverted L-shaped hole 12. Then, the roller 13 moves rapidly to the lower part of the vertical portion 12b while urging the inclined portion 25 to the left by virtue of the bias of the tension spring 15, so that the cartridge holder 14 is urged downward and assumes the loaded state. Consequently, the hub 4 of the magnetic disc 1 is urged to the turntable 16 by the pressing portion 17 which is attached to the cartridge holder 14, so the magnetic disc 1 is ready to rotate. On the other hand, since the magnetic head insertion aperture 5 of the cartridge 2 is in an opened state resulting from operation of the shutter 6 with an opening/closing pin (not shown) which is provided near the insertion opening 9, the pad 20 attached to the fore end of the arm 21 goes down as the cartridge holder 14 is forced down, whereby the magnetic disc 1 is urged against the magnetic head 19, ready for recording and playback.

In the above operation, the resistance induced when the roller 13 gets over the projecting portion 12c of the inverted L-shaped hole 12 gives the so-called "click" touch to the user who is doing the cartridge insertion operation, that is, the user can feel the transfer from unloaded to loaded state.

For returning the cartridge holder 14 from the loaded state to the unloaded state, the eject button 10 is pushed inwards, thereupon the inclined push-up portion 25 of the cam member 24 pushes up the lower portion of the roller 13 which is positioned in the lower part of the vertical portion 12b of the inverted L-shaped hole 12, so that the roller 13 goes up while being held between the inclined portion 25 and the vertical portion 12b of the inverted L-shaped hole 12. When the roller 13 reaches the horizontal portion 12a, the inclined portion 25 no longer abuts the roller 13, so the roller 13 gets over the projecting portion 12c of the inverted L-shaped hole 12 and moves to the fore end portion of the horizontal portion 12a by virtue of the bias of the tension spring 15 of the cartridge holder 14. With this movement of the roller 13, the cartridge holder 14 moves upward and toward the insertion opening 9 until it assumes the state before loading.

According to the recording/reproducing device of the present invention having the above-described construction, with a simple construction of the roller and the projecting portion of the cam hole, it is possible to give the "click" touch to the user at the time of transfer to the loaded state in the disc cartridge inserting operation.

What is claimed is:

1. A recording/reproducing device having a frame and a cartridge loading apparatus in said frame with a cartridge holder adapted to be moved from an unloaded state to a loaded state by a rearward horizontal movement and then a vertical downward movement to the loaded state upon insertion of a cartridge in said cartridge holder, a roller provided on a side portion of said cartridge holder, and guide means in said frame forming a guide hole and camming surfaces on which said roller is guided, said camming surfaces including a horizontal surface and a vertical surface for guiding said cartridge holder in said rearward horizontal and said downward vertical movements, wherein the improvement comprises a projecting portion smaller than the diameter of said roller formed on a rearward end of said horizontal camming surface near said vertical camming surface, said projecting portion providing a click contact as said roller is moved horizontally rearward over said projecting portion.

2. A recording/reproducing device according to claim 1, wherein said guide means is inverted L-shaped.

3. A recording/reproducing device according to claim 1, wherein said guide means is formed in two positions on each side portion of the frame.

4. A recording/reproducing device according to claim 1, wherein said horizontal surface of said guide means has a width larger than the diameter of said roller.

5. A recording/reproducing device according to claim 1, wherein said cartridge holder is urged in the direction of a disc cartridge insertion opening and in the direction of a loaded state position.

6. A recording/reproducing device according to claim 5, characterized by including a tension spring stretched between said cartridge holder and the side portion of the frame body.

* * * * *